Sept. 1, 1936.    A. C. RUGE    2,053,226
EARTHQUAKE RESISTANT STRUCTURE
Filed Sept. 1, 1934    2 Sheets-Sheet 1

Inventor.
Arthur C. Ruge
by Heard Smith & Tennant
Attys.

Sept. 1, 1936.   A. C. RUGE   2,053,226
EARTHQUAKE RESISTANT STRUCTURE
Filed Sept. 1, 1934   2 Sheets-Sheet 2
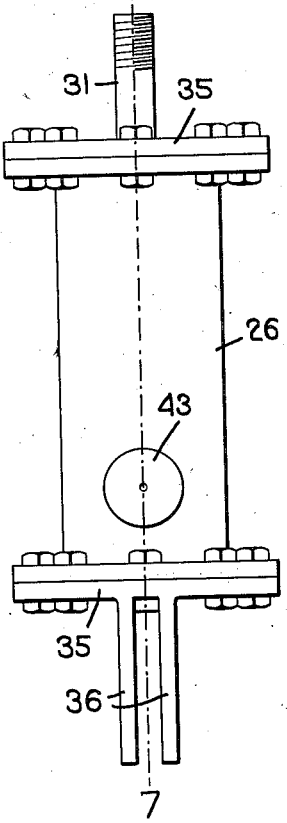
Inventor.
Arthur C. Ruge
by Heard Smith & Tennant.
Attys.

Patented Sept. 1, 1936

2,053,226

UNITED STATES PATENT OFFICE 2,053,226

EARTHQUAKE RESISTANT STRUCTURE

Arthur C. Ruge, Cambridge, Mass., assignor to Charles W. Mowry, Marblehead, Mass., as trustee Application September 1, 1934, Serial No. 742,390

5 Claims. (Cl. 189—34)

This invention relates to fabricated structures of various types made up of structural elements or members fabricated together, and each connecting one portion of the structure to another portion and has for its general object to provide a structure with increased ability to withstand earthquake shocks and motions.

The invention is applicable to a wide variety of fabricated structures, such for instance as framed towers for use as tank towers, lighthouses, observation towers, radio towers, windmill towers, and any other structure or framework used to support a building, machinery, or other object; structural building frames such as are used in office and store buildings, mill buildings, factories, auditoriums and the like; bridges; trestles; stand pipes, chimneys, etc.

In carrying out the invention I propose to introduce into some or all of the main structural members of the fabricated structure spring elements which are constructed so that they are substantially rigid or non-yielding under any normal stress to which the corresponding structural members are subjected, but which have the capability of yielding when such structural members are subjected to an abnormal stress, such for instance as would be produced by the occurrence of an earthquake.

These spring elements do not import into the structure any resilient or flexible quality or characteristic so long as the members making up said structure are subjected to normal strains or stresses, but when the members of the structure are subjected to an abnormal strain or stress such as might be occasioned by the occurrence of an earthquake, the spring elements yield, thereby introducing a flexible or resilient characteristic into the structure which is designed to absorb or partially absorb the abnormal strains and prevent breakage or failure of any elements of the structure due to such abnormal strains.

The spring elements which are used may have various shapes and construction without departing from the invention. Each spring element is preferably provided with means to place it under initial stresses sufficient to make it substantially rigid under normal conditions of use. Under such normal conditions, therefore, the various spring elements function as rigid elements so that the various members composing the structure have only their normal flexibility or deflectability, When, however abnormal conditions arise which result in subjecting the members of the structure to abnormal stresses which are greater than the initial stresses to which the springs are normally subjected, said springs will yield or give and thereby import into the structures a degree of flexibility which provides for the absorption of the abnormal strains without causing breakage or failure of the members of the structure.

In some cases it may be desirable to associate a damping or friction device with the spring element to increase the efficacy thereof. Where such damping or friction device is used the initial stress of the spring may be reduced somewhat because such friction or damping action will add to the rigidity of the element when it is operating under the ordinary stresses to which it will be normally subjected. Under conditions of abnormal stress, however, the spring element will be able to import flexibility to the structure as above described, and, in addition, the damping or friction action will enable the element to absorb or dissipate energy from the structure thus tending to decrease the motions or deflections of the structure such as might be produced as the result of earthquake shocks and motions.

In order to give an understanding of the invention I have illustrated it as it might be applied to a tank tower but I wish to make it clear that the invention is equally applicable to a great variety of other structures and that the details may be widely varied.

In the drawings:

Fig. 6 is a view illustrating a form of spring element embodying my invention in which has been incorporated a friction or damping device;

Fig. 7 is a section on the line 7—7, Fig. 6.

Figure 1:
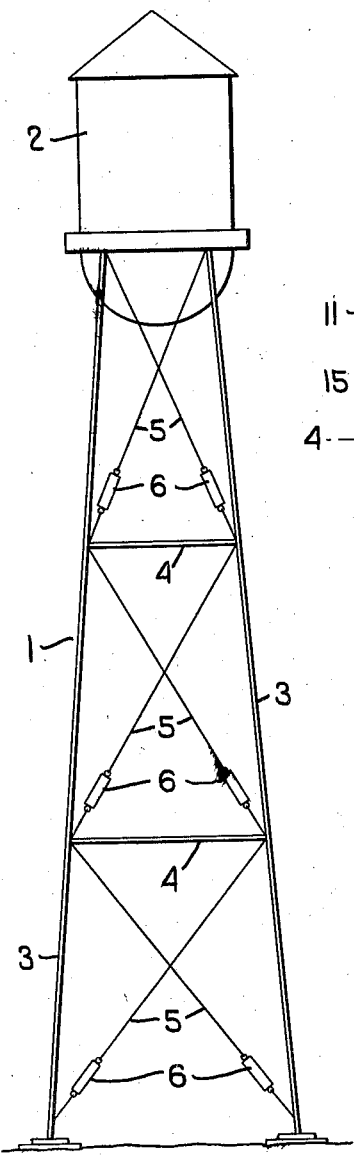
Fig. 1 is a view of a water tank tower having my improvements incorporated therein.

In the drawings 1 indicates a fabricated tower for supporting a water tank and 2 indicates the water tank supported by the tower. The fabricated structure 1 is formed with the usual upright or post members 3 which are tied together by cross members 4, the structure being braced by suitable diagonal braces 5 which may be members capable of taking tension and/or compression stresses, this being a common way to erect towers which are used for supporting water tanks, windmills and the like, or which are used for observation towers, lighthouses, radio towers, etc. The structural elements or members 3, 4 and 5 are located within the body of the fabricated structure and each connects one portion thereof to some other portion as usual in fabricated structures of this type.

In accordance with my invention some or all of the main members of which the fabricated structure is composed have incorporated therein spring elements, each of which is constructed so that it is preferably rigid or non-yielding under any strains or stresses to which the corresponding member of the structure is normally subjected but which has the capability of yielding and thus importing extensibility or flexibility into said member when the latter is subjected to abnormal stresses, such as might be liable to cause failure of said member if it did not have the capability of yielding. In the construction shown in the drawings these spring elements are introduced into the brace elements 5 of the structure and are indicated generally at 6 in Fig. 1, although I wish to state that the invention would not be departed from if the spring elements were used in other members of the fabricated structure, as said elements may be introduced into the compression members of a structure. These spring elements may be introduced into members of the fabricated structure which are subjected to compression stresses or into members which are subjected to tension stresses or into members which are subjected to both compression stresses and tension stresses. The particular members in which the spring elements are incorporated will depend largely on the character of the structure.

Each spring element is normally placed under initial stresses sufficient to make it substantially rigid under ordinary conditions and hence although each structure member has a spring element in it yet these elements are normally substantially rigid and do not import any flexibility or extensibility into the corresponding structure member.

Figure 2:
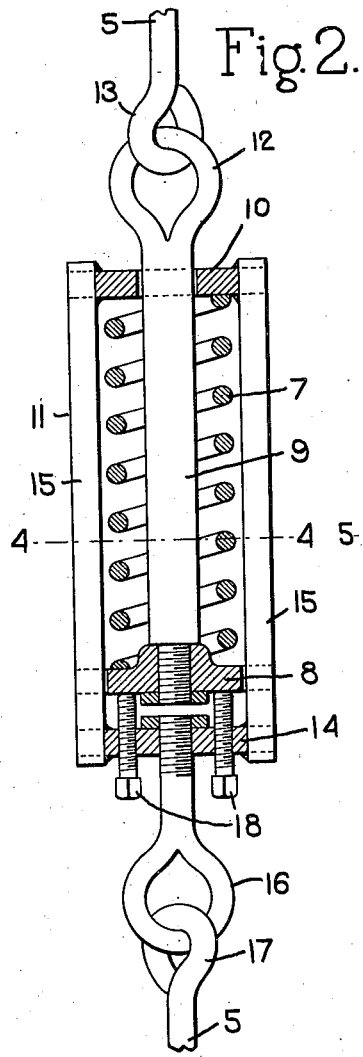
Fig. 2 is an enlarged sectional view showing one form of spring element embodying my invention.
Figure 4:
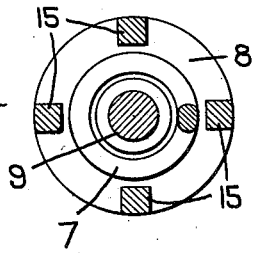
Fig. 4 is a section on the line 4—4, Fig. 2.

One form of spring element is shown in Figs. 2 and 4. This spring element comprises a coil compression spring 7 which is confined between a head or plate 8 carried by a rod 9 which is encircled by the spring and a head or plate 10 carried at one end of a housing or cage 11. The rod 9 is shown as provided with an eye 12 to which one section 13 of the brace member 5 is connected. The cage 11 is constituted by the plate or head 10 and another plate or head 14 which are rigidly connected by the bars 15, the spring 7 being enclosed within the bars 15. The head or plate 14 is provided with an eye 16 to which the brace section 17 is connected.

Means are provided for placing the spring 7 under an initial stress. For this purpose the head 14 is provided with adjusting screws 18 which are screw threaded therethrough and which bear against the head 8. By turning up the screws 18 the spring 7 is placed under an initial stress and the amount of such stress can be varied by adjusting the screws 18 as will be obvious.

As stated above when the structure is erected the adjusting screws 18 for each spring element will be adjusted to place the spring 7 of said element under an initial stress which is preferably sufficient to make it substantially rigid under ordinary conditions of use. Because each spring is thus subjected to an initial stress the spring elements will constitute substantially rigid or non-yielding elements so long as the corresponding structure members 5 are not subjected to stresses greater than the initial stresses to which the spring elements are subjected. Hence the incorporation of such a spring element into the structure does not import into the structure any flexibility or deflectability other than it would normally possess so long as the structure is not subjected to any strains other than those to which it would normally be subjected under ordinary conditions of use. For such ordinary conditions of use, therefore, the structure is just as rigid as if the spring elements were not present. If, however, the structure is subjected to sudden or momentary abnormal stresses such as would be caused by an earthquake and such as would subject any spring-containing member to a momentary abnormal stress sufficient to cause failure of a similar member not provided with a spring element, such momentary abnormal stress will be absorbed by the yielding movement of the spring thereby preventing breakage or failure of the spring-containing member.

Figure 3:
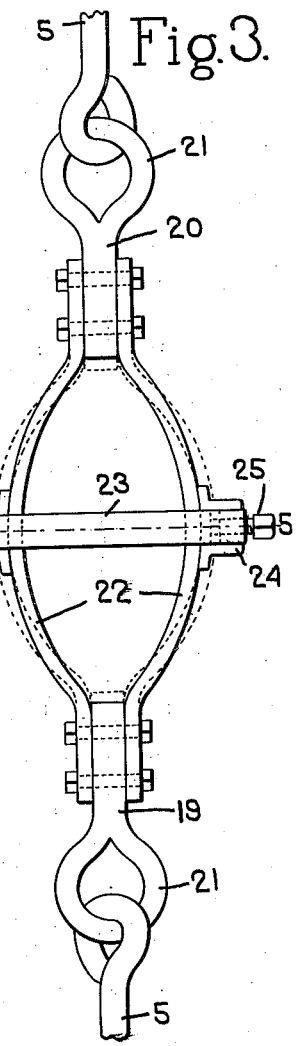
Fig. 3 is a view illustrating a different form of spring element embodying my invention.
Figure 5:
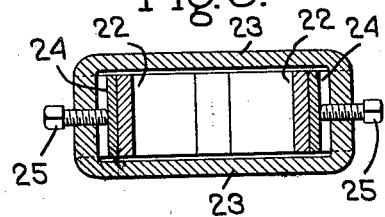
Fig. 5 is a section on the line 5—5, Fig. 3.

In Figs. 3 and 5, I have illustrated a different form of spring element which may be used. The spring element shown in said figures comprises two end members 19 and 20 adapted to be connected to the sections 13, 17 of the brace member 5 or other member of the structure, each end member 19, 20 being shown as having an eye 21 for convenience in securing it to the brace member section. These members 19 and 20 are connected by two spring elements 22 each having a semi-elliptical or similar shape. A pulling strain applied to the spring element will tend to straighten the spring members 22 and thereby elongate the spring element.

Means are provided for applying an initial stress to this spring. One way of doing this is to enclose the spring members 22 in a yoke 23 which limits their separating movement. The springs 22 are shown as provided with guides or retainers 24 which hold the yoke 23 in place and the yoke is shown as provided with adjusting screws 25 by which the initial stresses to which the spring element is subjected may be adjusted. By turning up the adjusting screws 25 to force the springs 22 toward each other it is possible to increase this initial stress, while by backing off the screws the initial stress will be decreased.

The spring shown in Figs. 3 and 5 operates in the same way as that described above. In erecting the structure, whether it is a tower as shown in the drawings, or whether it is a fabricated framework of a building, or whether it is a bridge, trestle, or any other structure, the spring elements will be incorporated in some or all of the main members of the structure and in doing this said spring elements will preferably be adjusted so that each will be under an initial stress which is sufficient to make the element substantially rigid during any ordinary use to which the structure is put. In the case of a water tower or a windmill tower, for instance, it may be desirable to adjust the spring elements so that the initial stresses to which they are subjected will be as great as any stress to which the corresponding structure element would be subjected due to the weight of the tower and/or to any ordinary wind pressure to which the tower may be subjected. Under these conditions the spring elements are normally rigid elements and they do not import into the structure any flexibility. If, however, the structure is subjected to sudden or momentary abnormal stress such as might be developed therein by an earthquake, and which would be sufficient to rupture or fracture or cause failure of some members of the structure if they were not provided with the spring elements, then the springs function as springs to impart sufficient flexibility into the structure to absorb said momentary abnormal stress and thereby prevent such failure.

In Figs. 6 and 7, I have illustrated a different form of spring element which has a damping or friction device incorporated therein. A spring element having this construction is also adapted for use in places indicated at 6 in a structure such as shown in Fig. 1 or in other types of fabricated structures.

The spring element shown in Figs. 6 and 7 comprises a housing or casing 26 formed with a spring-receiving chamber 27 and with a retarding chamber 28. 29 indicates a coil spring received in the spring-receiving chamber 27, one end of the spring resting against a head 30 carried by a rod or stem 31 which projects through the end of the casing, and the other end of the spring resting against an adjustable backing plate 32. The stem or rod 31 is connected to one of the sections 5 of the member in which the spring is employed, and, if desired, this connection may be made through the medium of a turn buckle 33. The backing plate 32 is backed by two adjusting screws 34 which are screw threaded in the end or head 35 of the casing 26. The end of the casing having the retarding chamber 28 therein is constructed to be attached to the other section of the member 5 and for this purpose the head or end 35 of the casing is provided with attaching flanges 36 to which a loop 38 on the other section of the member is secured by a bolt 37.

The rod or stem 31 is provided with an extension 39 which passes through the partition wall 40 between the fluid-receiving chamber 28 and the spring-receiving chamber 27, said extension having a piston head 41 thereon which fits the chamber 28. This chamber 28 is provided with restricted ports which provide for the passage of fluid from one side to the other of the piston 41 as the latter moves in the chamber 28. Various arrangements of parts may be employed for this purpose. As herein shown there is one port 42 leading to a chamber 43 and adapted to be closed by an outwardly-opening check valve 44 that is acted on by a spring 45. The chamber 28 is also provided with another constantly open port 46 leading to a chamber 47. The chambers 43 and 47 are connected through a pipe connection 48 and the chamber 47 has a check valve 49 therein which is acted on by a spring 50 and which normally closes the port 51 through which the pipe connection 48 communicates with the chamber 43. This pipe connection 48 is also provided with a branch connection 52 which communicates with the chamber 28 through the head 35.

Any suitable fluid, such as oil, may be used in the chamber 28 and a sufficient quantity of the fluid is employed to fill the chambers 43, 47 and the pipe connections 48, 52. In order to keep these chambers and pipe connections filled I have shown a supply tank 53 which is situated above the level of the chambers 28, 43, 47 and which is connected to the pipe connection 48 through a pipe connection 54.

Assuming the parts are in the position shown in Fig. 7, then if a stress is applied to the member 5 sufficient to compress the spring 29 and to raise the piston 41, fluid in the chamber 28 above the piston will be forced out through the port 42 into the chamber 43 and such fluid will flow through the pipe connection 52 into the chamber 28 beneath the piston 41. The restricted port 42 and the spring-pressed valve 44 provide resistance against the flow of fluid and thus a force is exerted on the piston 41 tending to oppose the upward motion of the rod 31.

During any upward movement of the piston 41 the valve 49 will be closed so that the fluid can only escape from the chamber 28 through the port 42. During the downward movement of the piston 41 the valve 44 will be closed and the valve 49 will open thus allowing the fluid to flow from the lower end of the chamber 28 through the pipe connections 52, 48 into the chamber 47 and thence through the port 46 into the chamber 28 above the piston 41.

If the device is used in a tension member only it may be constructed so as to allow relatively free flow of the fluid from the lower end of the chamber 28 through the port 46 into the upper end of said chamber. On the other hand, if the element is to be introduced into a compression member or into a member capable of carrying both tension and compression stresses then it may be desirable to arrange the ports and the valves to provide frictional or damping resistance against motion of the piston 41 in both directions. While in the drawings I have shown one construction exemplifying the spring having the damping or frictional device associated therewith, yet I wish to state that this feature may be embodied in a wide variety of structures without departing from the invention.

This invention is of especial importance in preventing damage to structures by earthquake shocks and motions because the presence of these spring elements in a structure gives it the ability to withstand earthquake shocks and motions of large amplitudes and of all periods without causing failure of any members of the structure or of the structure as a whole.

I claim:

1. A fabricated structure having interior bracing members, some of which are subjected to tension strain and some of which are subjected to compression strain, a spring element in some at least of the members subjected to tension strain, each spring element including a spring continuously subjected to the tension strain to which the corresponding member is subjected and means independent of such tension strain to maintain the spring normally under a stress at least as great as that to which it is subjected by any tension strain existing in the corresponding member under normal conditions, whereby under such normal conditions the spring element is a rigid, non-yielding element but is adapted to yield when the member is subjected to a momentary abnormal strain, thereby absorbing such abnormal strain and preventing failure of the member.

2. A fabricated structure having interior bracing members, some of which are subjected to tension strain and some of which are subjected to compression strain, a spring element in some at least of said members, each spring element including a spring continuously subjected to the strain to which the corresponding member is subjected and means independent of such strain to maintain the spring normally under a stress at least as great as that to which it is subjected by any strain existing in the corresponding member under normal conditions, whereby under such normal conditions the spring element is a rigid, non-yielding element but is adapted to yield when the member is subjected to a momentary abnormal strain and thereby absorb such abnormal strain and prevent failure of said member.

3. A fabricated structure comprising structural members fabricated together and each connecting one portion of the structure to another portion, some of which members are subjected to tension strain and some of which are subjected to compression strain, a spring element in some at least of the members subjected to tension strain, each spring element including a spring continuously subjected to the tension strain to which the corresponding member is subjected, means independent of such tension strain to maintain the spring normally under a stress at least as great as that to which it is subjected by any tension strain existing in the corresponding member under normal conditions, whereby under such normal conditions the spring element is a rigid, non-yielding element but is adapted to yield when the member is subjected to a momentary abnormal strain, thereby absorbing such abnormal strain and preventing failure of the member and damping means to apply a retarding force to the yielding movement of the spring.

4. A fabricated structure comprising structural members fabricated together and each connecting one portion of the structure to another portion and subjected to strains exerted in the direction of its length, a spring element in some at least of said members, each spring element including a spring continuously subjected to the strain in the direction of the length of the corresponding member to which said member is subjected and means independent of such strain to maintain the spring normally under a stress at least as great as that to which it is subjected by any strain existing in the corresponding member under normal conditions, whereby under such normal conditions the spring element is a rigid, non-yielding element, but is adapted to yield when the member is subjected to a momentary abnormal strain and thereby absorb such abnormal strain.

5. A tower structure comprising structural members fabricated together, some of the members composing the tower being subjected to strain exerted in the direction of their length, a spring element in some at least of said members, each spring element including a spring continuously subjected to the strain to which the corresponding member is subjected and means independent of such strain to maintain the member normally under a stress at least as great as that to which it is subjected by any strain existing in the corresponding structural member under normal conditions, whereby under such normal conditions the spring element is a rigid non-yielding element, but is adapted to yield when the member is subjected to a momentary abnormal strain and thereby absorb such abnormal strain.

ARTHUR C. RUGE.